United States Patent [19]

Scheffler

[11] Patent Number: 5,134,697
[45] Date of Patent: Jul. 28, 1992

[54] REMOTE MEMORY-MAPPED DISPLAY WITH INTERACTIVITY DETERMINATION

[75] Inventor: Lee J. Scheffler, West Newton, Mass.

[73] Assignee: Prime Computer, Framingham, Mass.

[21] Appl. No.: 627,553

[22] Filed: Dec. 10, 1990

Related U.S. Application Data

[63] Continuation of Ser. No. 121,092, Nov. 16, 1987, abandoned.

[51] Int. Cl.$^5$ .............................................. G06F 12/00
[52] U.S. Cl. .................................. 395/425; 364/237.2; 364/239.7; 364/243.5; 364/245.4; 364/265.6; 364/256.8; 364/260.2; 364/DIG. 1; 395/165
[58] Field of Search ... 364/200 MS File, 900 MS File; 340/750; 395/425, 164, 165, 166

[56] References Cited

U.S. PATENT DOCUMENTS

| | | | |
|---|---|---|---|
| 4,435,792 | 3/1984 | Bechtolsheim | 365/230 |
| 4,586,158 | 4/1986 | Brandle | 364/900 |
| 4,642,789 | 2/1987 | Lavelle | 364/900 |
| 4,642,794 | 2/1987 | Lavelle et al. | 364/900 |
| 4,646,261 | 2/1987 | Ng | 364/900 |
| 4,688,190 | 8/1987 | Bechtolsheim | 364/900 |
| 4,807,182 | 2/1989 | Queen | 364/900 |
| 4,819,154 | 4/1989 | Stiffler et al. | 364/200 |

Primary Examiner—Thomas C. Lee
Assistant Examiner—Ayni Mohamed
Attorney, Agent, or Firm—Wolf, Greenfield & Sacks

[57] ABSTRACT

An apparatus for rapidly updating a target display buffer memory from a source display buffer memory using a communication subsystem includes an element for associating a region number and an update indicator with each of a plurality of data-containing regions in the source display buffer memory. As display elements in the source display buffer memory are modified, the corresponding update indicator is modified. An update monitoring element periodically examines the update indicators of all regions. A transmitting element transmits the modified regions over the communication subsystem to corresponding regions within the target display buffer memory. The update indicators for the transmitted regions are further modified to indicate that the corresponding region of the source display buffer memory has been copied. According to another aspect of the invention, a configuring element is provided which dynamically defines the shape, size and configuration of the regions of the source display buffer memory to correspond to regions of arbitrary contiguity in the target display buffer memory so as to be suitable for text and graphics display applications.

11 Claims, 3 Drawing Sheets

|  (1)<br>SCAN LINE<br>START<br>ADDRS | (2)<br>SCAN LINE<br>NUMBER | BYTE OFFSET WITHIN SCAN LINE |  |  |  |  |
|---|---|---|---|---|---|---|
|  |  | 0  15 | 16  31 | 32  47 | 48  63 | 64  79 |
| 0 | 0 | 0 | 1 | 2 | 3 | 4 |
| ⋮ | ⋮ |  |  |  |  |  |
| 3120 | 39 |  |  |  |  |  |
| 3200 | 40 | 5 | 6 | 7 | 8 | 9 |
| ⋮ | ⋮ |  |  |  |  |  |
| 6320 | 79 |  |  |  |  |  |
| 6400 | 80 | 10 | 11 | 12 | 13 | 14 |
| ⋮ | ⋮ |  |  |  |  |  |
| 9520 | 119 |  |  |  |  |  |
| 9600 | 120 | 15 | 16 | 17 | 18 | 19 |
| ⋮ | ⋮ |  |  |  |  |  |
| 12720 | 159 |  |  |  |  |  |
| 12800 | 160 | 20 | 21 | 22 | 23 | 24 |
| ⋮ | ⋮ |  |  |  |  |  |
| 15920 | 199 |  |  |  |  |  |

*Fig. 3A*

| (1)<br>MEMORY<br>ADDRESS | LOOKUP MEMORY CONTENTS | |
|---|---|---|
|  | CELL NUMBER | REGION NUMBER |
| 0 - 15 | 0 | 0 |
| 16 - 31 | 1 | 1 |
| 32 - 47 | 2 | 2 |
| 48 - 63 | 3 | 3 |
| 64 - 79 | 4 | 4 |
| 80 - 95 | 5 | 0 |
| 96 - 111 | 6 | 1 |
| 112 - 127 | 7 | 2 |
| 128 - 143 | 8 | 3 |
| 144 - 159 | 9 | 4 |
| ⋮ | ⋮ | |
| 3120 - 3135 | 195 | 0 |
| 3136 - 3151 | 196 | 1 |
| 3152 - 3167 | 197 | 2 |
| 3168 - 3183 | 198 | 3 |
| 3184 - 3199 | 199 | 4 |
| 3200 - 3215 | 200 | 5 |
| 3216 - 3231 | 201 | 6 |
| 3232 - 3247 | 202 | 7 |
| 3248 - 3263 | 203 | 8 |
| 3264 - 3279 | 204 | 9 |
| 3280 - 3295 | 205 | 5 |

*Fig. 3B*

REMOTE MEMORY-MAPPED DISPLAY WITH INTERACTIVITY DETERMINATION

This application is a continuation of U.S. patent application Ser. No. 121,092, filed Nov. 16, 1987, now abandoned.

BACKGROUND OF THE INVENTION

This invention relates to digital processing apparatus having one or more display terminal devices interconnected by communications lines, and in particular, provides a system for rapidly updating a remote display using communications lines.

Computer systems typically include target display terminals and display buffers for storing data which controls and modifies the images displayed on the display terminals. In computer systems having remote terminals, the need exists to quickly and efficiently update remote displays, and to ascertain user interactivity.

Many computer programs cause images to be displayed on the target display terminal by directly writing to the display buffer memories. Also, computer systems having virtual memory typically monitor the presence of modified flag bits known as modified, or "dirty" update flags, to determine whether data in a region of computer memory needs to be copied to disk before that region of memory is reused for another purpose. Some timesharing computer systems additionally use the fact that a program has not requested input recently to determine that the program is no longer interactive.

In some computer systems there may be many programs active at the same time. These systems include both single-user multi-tasking systems, and multi-user systems, sometimes referred to as "timesharing" systems. In multi-tasking and multi-user systems, resources such as CPU time, disk access, memory, and access to critical data structures are allocated dynamically on a moment-by-moment basis by an element called a scheduler. It is typical for such a scheduling element to use some indication of whether a particular program is currently actively interacting with a user to determine approximate dynamic allocation of system resources. One conventional indicator is whether the program has recently requested input from the user; if it has not, then it can be judged to be no longer interactive.

Update indicators have not, however, previously been applied to the task of updating target displays. Additionally, no prior art system has applied update indicators or other display indicators to display memory write operations to determine interactivity.

Virtual memory systems known in the art associate update flags with virtual memory pages. Such pages are typically composed of $2^n$ numerically contiguous linear memory addresses, starting on a $m2^n$ address boundary, where m is zero or a positive integer and n is a positive integer, typically in the range 9-12, chosen to optimize the performance characteristics of moving entire pages between main memory and disks. Prior art virtual memory systems having memory pages constrained to numerically contiguous linear memory addresses are not efficiently adapted to display applications requiring display regions of arbitrary contiguity.

Other memory organization schemes, known as cache indexing schemes, often use complex mappings of addresses to locate a cache cell that may contain a copy of the desired memory cell. However, these schemes are usually based on simple logical combinations of address bits, so as to provide high-speed cache indexing, and such systems, like virtual memory systems, do not lend themselves to display applications requiring regions of arbitrary contiguity.

In short, prior art systems incorporating cache indexing schemes, or virtual memory systems with update flags, do not permit dynamic modification of the shape, size or configuration of regions, a capability which is useful in the rapid and efficient updating of remote target displays.

It is accordingly an object of the invention to provide a method and system for rapidly updating a remote display from a memory-mapped display buffer. The term "remote" is used herein to denote "another" display, rather than a "distant" display. The invention can be practiced in connection with displays which are physically proximate to the display buffer.

It is also an object of this invention to provide an improved memory-mapped display system which allows the shape, size and configuration of regions to be changed dynamically, to permit defining accessed memory regions of arbitrary and dynamically changeable contiguity which are suitable for applications such as text and graphics display.

It is another object to provide a virtual memory display system which applies the above-mentioned dynamically changeable memory regions to updating of a remote memory-mapped display.

Another object of the invention is to use memory mapped display indicia on a moment-by-moment basis to aid in determining which of a plurality of programs running on the computer are currently performing interactive functions, in order to provide these programs with preferred scheduling of or access to other computer resources to provide such interactivity, and in order to remove such preference when such a program shows evidence of no longer being interactive.

SUMMARY OF THE INVENTION

The invention discloses a method and apparatus for rapidly updating a remote target display buffer memory from a source display buffer memory using a communications subsystem. The method includes associating a region number with each separately modifiable display element, such as a pixel or character, in the source display buffer memory. An update indicator is associated with each region.

As a program modifies an element in the source display buffer memory, the address of such modification is used to determine the region number and modify the associated update indicator. An update monitoring element periodically examines the update indicators for all regions. The source display buffer memory data in each region having its update indicator modified are encoded and transmitted over the communications subsystem for the purpose of updating the corresponding display elements in the target display buffer memory. The update indicator for each region for which data is transmitted is then further modified to indicate that the corresponding region of source display buffer memory has been copied.

The update indicator can be a binary flag, a counter, a shift register, or a queue containing region numbers identifying regions that have been changed, or any of a variety of indicia capable of representing two distinguishable states.

Another aspect of the invention includes a mapping element responsive to the address data from the input monitor element. The mapping element maps the addresses of data being modified into region numbers identifying those regions having changed source buffer memory contents.

The invention also includes an update monitor element responsive to the above-mentioned region number data. The update monitor element generates signals representative of changed source display buffer contents and transmits such signals to the target terminal for updating the target display buffer memory in correspondence with changed source display buffer memory contents.

In one embodiment of the invention, raster-scan display terminals are utilized, in which groups of pixels that are horizontally and vertically contiguous on the display correspond to memory regions. In another embodiment of the invention, the bit-mapping element adaptively modifies region configurations to correspond to one or more full scan lines of CRT terminals, or contiguous portions of a plurality of contiguous scan lines of CRT terminals, to adapt region configuration to different text and graphics display applications. The mapping element uses a different map depending on display mode. Display mode is a function of I/O instruction selection of graphics/text modes and heuristics, i.e., matching of access patterns to application.

The invention further discloses a system for dynamically allocating communications channel bandwidth among a plurality of display buffers based on display update indicia for each source display buffer. The system includes a monitor element, an activity measuring element and a bandwidth allocation element. The monitor element checks each region indicator to identify regions containing changed display pixels. The activity measuring element determines the number, frequency or other activity measure of display regions changed during a given time interval at each buffer, and generates activity data corresponding to each buffer. The bandwidth allocation element dynamically allocates portions of the communications channel bandwidth, so that buffers showing a greater number of changed pixels are allocated a greater portion of bandwidth. In this system, the activity indicated by changed display regions is used as a measure of activity at the buffer, and serves as a basis for allocating the communications channel among various buffers in accordance with the respective measures of activity.

The invention also discloses a system for dynamically allocating central processor, memory and other resources among a plurality of display buffers, based on display activity indicia for each display buffer. The system includes a monitor element which scans for modified update indicators for each buffer and generates region number data identifying the changed display Pixels associated with each buffer. If a program has changed any regions recently, it is interactive. If the program has not changed any regions recently, it is not interactive. The system also includes an activity measuring element which determines the number, frequency or other activity measure of indicators changed during a given time interval at each buffer, and generates activity data corresponding to each buffer. The system further includes a multi user system resource scheduling element which is responsive to the activity level data, and which, based on the activity level data, dynamically allocates CPU resources so that programs showing activity receive preferred allocation of CPU resources.

The invention will next be described in connection with certain illustrated embodiments. However, it should be clear that various changes, modifications and additions can be made by those skilled in the art without departing from the spirit or scope of the invention as defined in the claims.

BRIEF DESCRIPTION OF DRAWINGS

For a fuller understanding of the nature and objects of the invention, reference should be made to the following detailed description and the accompanying drawings in which.

DESCRIPTION OF ILLUSTRATED EMBODIMENTS

Figure 1:
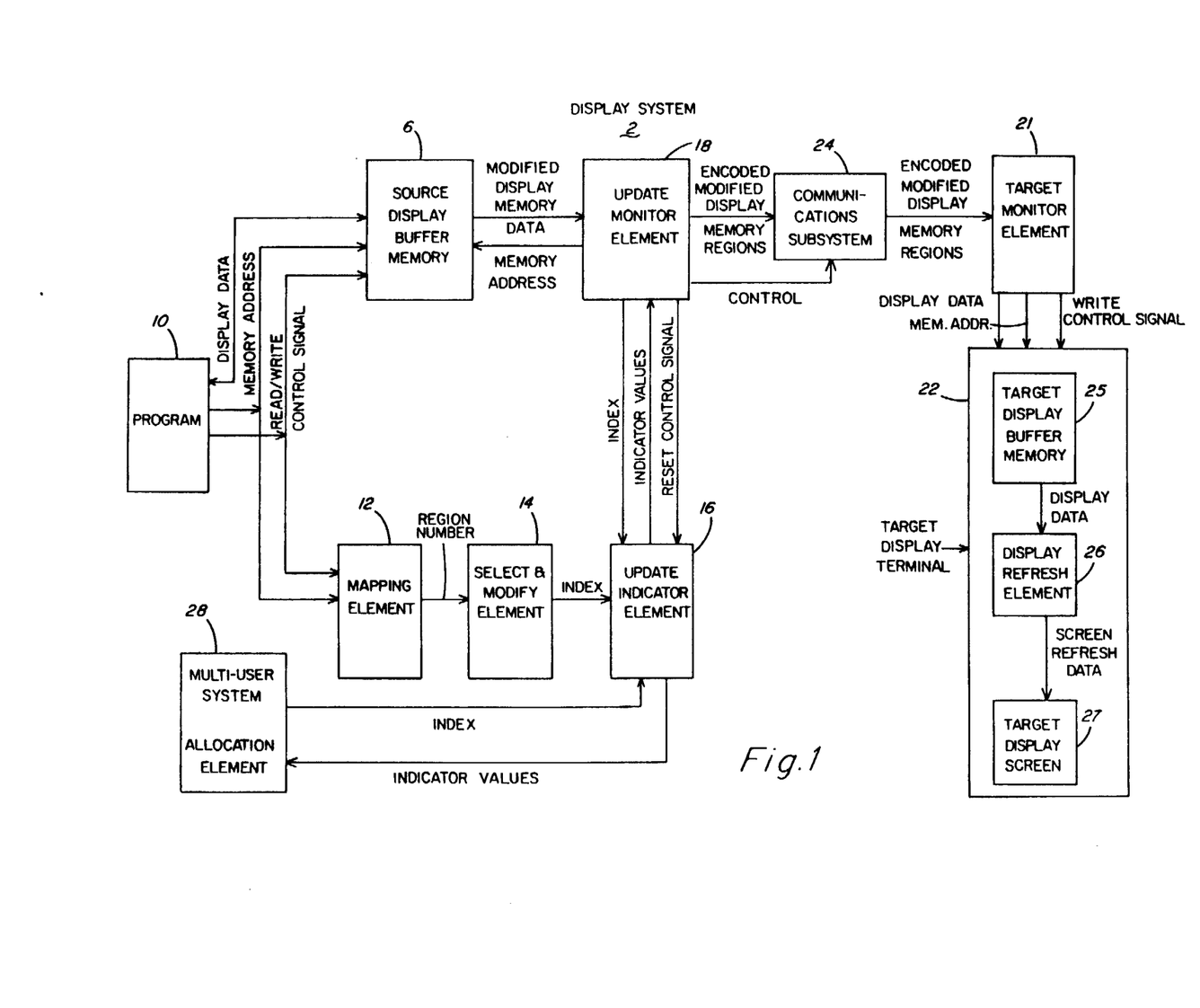
FIG. 1 is a block diagram of a remote memory-mapped display according to the invention.

FIG. 1 is a block diagram of a remote memory-mapped display system according to the invention. The display system 2 includes a program 10 which, in order to generate a visual image, produces a sequence of write and read operations to addresses in the source display buffer memory 6. Each such read or write operation consists of a memory address, a unit of data, and a read/write control signal. The program 10, through the memory system of the computer, is in communication with both the source display buffer memory 6 and the mapping element 12.

Source display buffer memory 6 is a memory element composed of conventional memory hardware well known in the art. It contains a set of memory addresses in which are stored digital values corresponding to a set of display elements, such as pixels, which correspond to locations on a display screen.

Mapping element 12 receives memory address and read/write control signals from program 10. Mapping element 12 assigns to each received memory address a region number representing the accessed region of source display buffer memory 6. The output signal of mapping element 12 is thus the number of the region of source display buffer memory 6 containing a modified memory address. This output signal is transmitted to select and modify element 14. The structure of mapping element 12 is described in greater detail below in connection with FIG. 2.

Select and modify element 14 is a controller unit which receives region number input from mapping element 12. Select and modify element 14 generates an index signal which controls the digital value of update indicator bits stored in memory addresses of update indicator element 16.

Update indicator element 16 is a memory unit containing a set of update indicator bits, each of which corresponds to a region of source display buffer memory 6. Those skilled in the art will understand that the update indicator element 16 can equivalently include a counter, a shift register, or a queue containing region numbers identifying regions that have been changed.

Update monitor element 18 asserts an index signal to update indicator element 16, and receives from update indicator 16 the value of the corresponding update indicator bit in update indicator element 16. One function of update monitor element 18 is thus to monitor the values of update indicator bits stored in update indicator element 16. This monitoring need not be executed at regular intervals. Accordingly, update monitor element 18 can be driven by interrupts, clocks or other events, in a manner known in the art, for sampling the values of update indicator bits.

Responsive to the update indicator values, update monitor element 18 addresses source display buffer memory 6 and receives modified display memory data from source display buffer memory 6. Update monitor element 18 then transmits data associated with modified display memory regions to communications subsystem 24. Following the transmission of such data to communications subsystem 24, update monitor element 18 asserts a reset control signal to turn off or "clear" update indicator bits in update indicator element 16 associated with the modified regions.

Those skilled in the art will understand that region modifications can continue between the time update monitor element 18 detects a modified region and the time at which the region is copied out to communications subsystem 24. Accordingly, the resetting operation is preferably performed so that such subsequent modifications are not overlooked by update monitor 18. The resetting of the indicator bits for a given region must occur before another modification to that region occurs.

One way to ensure that such subsequent modifications are detected is to turn off indicator bits as soon as their "on" state is detected. Then, while the corresponding region data is being transmitted, any new modifications to the region will again set the associated indicator bits. This resetting scheme ensures that each modification to a given region results in a change in the associated indicator bits. Other resetting schemes may also be employed.

Communications subsystem 24, utilizing apparatus known in the art, divides the communications channel among a plurality of remote display terminals, such as terminal 22, on a timesharing basis.

Target display terminal 22, in a preferred embodiment of the invention, includes target display buffer memory 25, display refresh element 26, and target display screen 27, each of which employs hardware elements known in the art.

Target display memory 25 is a conventional display memory structure, containing a set of addressable memory locations, as known in the art. The set of memory addresses contained in memory 25 is divided into regions corresponding to the regions of source display buffer memory 6. Target monitor element 21 decodes modified display memory regions arriving from communication subsystem 24 and writes display elements into the corresponding memory addresses in target display buffer memory 25.

Target display buffer memory 25 then transmits display data associated with such modified regions to display refresh element 26. Display refresh element 26 converts the display data it receives from target display buffer memory 25 to screen refresh data, in a manner known in the art, and transmits the screen refresh data to target display screen 27, where the data are displayed.

Those skilled in the art will understand that in certain embodiments of the invention, refresh element 26 is not employed. Refresh element 26 is not required, and target display buffer memory 25 and target display screen 27 may be combined, for example, when the invention is practiced in connection with static displays.

In a preferred embodiment of the invention, implemented on a multi-user computer system known in the art, a multi-user system resource allocation element 28 is provided. In such an embodiment, resource allocation element 28 addresses update indicator element 16 with an index signal, and receives from update indicator element 16 signals representative of the update indicator values. Resource allocation element 28, which may include software or hardware elements known in the art, utilizes the indicator values to determine the level of interactivity associated with each user. In particular, resource allocation element 28 evaluates the number, frequency or other activity measures of changed indicator elements associated with each user. A high number, for example, of changed indicator elements associated with a given user signifies a high level of interactivity for the user. Conversely, a low number of changed indicator elements associated with a given user signifies a low level of interactivity for that user.

On the basis of such interactivity information, resource allocation element 28 establishes respective priority levels for the processing resources accorded each user.

In a further preferred embodiment of the invention, elements 6, 12, 14, 16 and 22 illustrated in FIG. 1 are hardware devices, elements 18 and 21 are software entities, and element 24 is a combination of hardware and software. A hardware implementation of the invention offers a significant further advantage in operating speed over a software implementation of the invention, at the potential cost of reduced flexibility in defining memory regions.

In the operation of the embodiment illustrated in FIG. 1, source display buffer memory 6 receives display data from program 10. Conversely, program 10 can also receive display data from source display buffer memory 6. Together with the display data, source display buffer memory 6 receives read/write control and multiple-bit memory address signals from program 10. The memory address signals represent memory addresses corresponding to accessed or modified display elements.

The memory address and read/write control signals are also transmitted to mapping element 12. Upon a memory write access, mapping element 12 converts the memory address number to a corresponding region number representative of a display region. Mapping element 12 transmits the region number to select-and-modify element 14, which uses the region number to indicate that a write access has occurred to a region of memory by turning on, or "setting," one or more update indicator bits corresponding to that region of memory.

Mapping element 12 thus generates a memory map, representative of a display image, which is an n dimensional array of data elements divided into regions. Each time a program operation modifies a display element, such as a pixel, character or other display attribute in the memory map, an update indicator bit or bits associated with that region is turned on, or "set", by select and modify element 14.

Update indicator element 16 stores the update indicator bits for each region, and the update indicator bits are set in update indicator element 16 in response to index signals generated by select and modify element 14. Update monitor element 18 tests the values of the update indicator bits in the memory addresses of update indicator element 16. This operation examines the update indicators of regions of the memory map corresponding to the display. Update monitor element 18 then addresses source display buffer memory 6, causing data in those regions having a "set" update indicator to be copied out to communications subsystem 24 and target monitor element 21. The display data is then displayed on target display terminal 22. The update indicator for each region which is copied out is then turned off, or "cleared," in update indicator element 16.

In a preferred practice of the invention, if multi-user system scheduling element 28 finds no update indicators to be set in update indicator element 16 for any of the regions for a particular display, this display activity information is used to determine that a computer program is no longer interacting with the user, and the system resource allocation and scheduling unit 28 accords lower-priority timesharing computer response and resource allocation to that program.

The embodiment of the invention described above thus includes a network of elements which map source data into memory, dividing the mapped display data into regions. Only those regions having updated display data, as indicated by "set" indicator bits, are copied out to a remote target terminal for updating the target display. The invention thereby provides rapid updating of remote target displays and efficient use of communication bandwidth. The invention will next be described in connection with the structure of mapping element 12.

Figure 2:
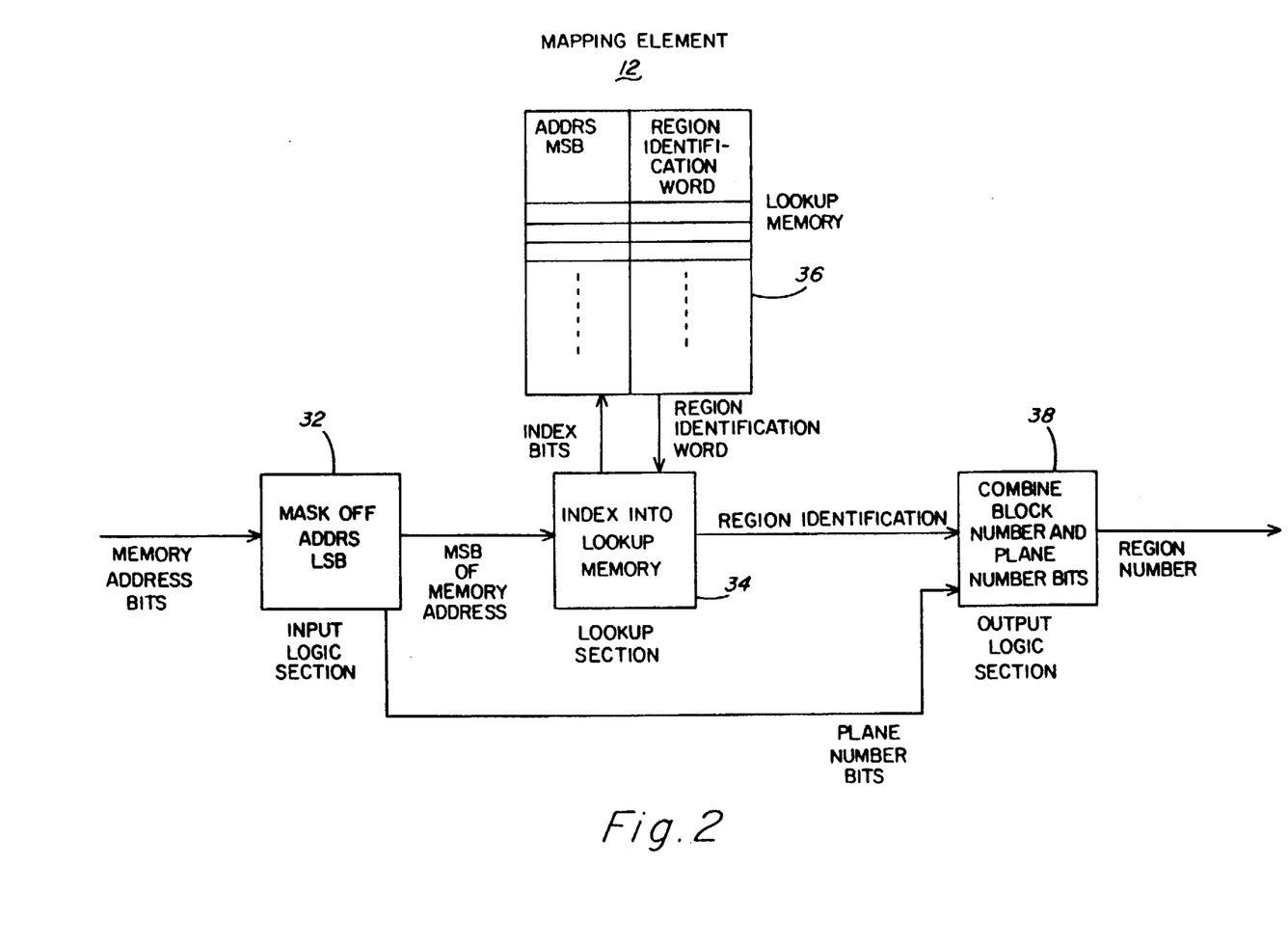
FIG. 2 is a block diagram of a mapping element according to the invention.

FIG. 2 is a functional block diagram of mapping element 12. The function of mapping element 12 is to determine which memory region contains the currently written address. Mapping element 12 therefore receives as its input a memory address signal from program 10 containing the memory address bits of the currently accessed address. Mapping element 12 transmits at its output a signal containing memory region number data.

Mapping element 12 is thus preferably utilized in a memory system in which the set of addresses corresponding to the display is divided into regions. Each memory region is composed of one or more non-contiguous memory blocks, and memory blocks are composed of a predetermined number of contiguous memory addresses.

In a preferred embodiment of the invention, each memory block is composed of $2^n$ contiguous memory addresses aligned on a $m2^n$ address boundary for non-negative integers m and n. Each region is composed o several such blocks corresponding to physically contiguous display elements on the display screen. When a memory address signal is received by input logic section 32, input logic section 32 masks off the least significant n bits (LSBs) of the address being processed. Input logic section 32 then transmits the most significant bits (MSBs) of the address to look-up section 34. In this embodiment of the invention, several different addresses with different MSBs may map into the same region numbers. Also, neighboring memory addresses in a given memory region may have different MSBs.

Look-up section 34 receives the signal from input logic section 32 containing the MSBs of the incoming memory address, and uses the MSBs of the address to index a cell in look-up section 36. Look-up memory 36 contains a memory cell corresponding to each given memory block for a given memory Plane, where the block has a corresponding block in the display.

The cells of look-up memory 36 are indexed according to the MSBs of addresses in display memory 6, and each cell contains a multi-bit "region identification word". Thus, look-up section 34 addresses look-up memory 36 with the MSBs of the incoming address, and reads out of the look-up memory 36 a region identification word. Look-up section 34 then transmits to output logic section 38 the region identification word associated with the address currently being accessed.

When the invention is practiced in connection with a multi-plane memory known in the art, input logic section 32 transmits to output logic section 38 plane number bits contained in the address being processed. Output logic section 38 then combines region identification word bits received from look-up section 34, and the plane number bits, if any, received from input logic section 32, to form a region number of the region containing the address being processed. The region identification bits may be, for example, the LSBs of the region number, and the plane number bits, if any, may be the MSBs of the region number transmitted by output logic section 38. This allocation of MSBs and LSBs is not essential. All that is required is to provide a different region number for each plane at the same screen spot.

Mapping element 12 thus provides a system for dividing display memory maps directly modified by programs into multiple regions that can be independently updated and transmitted to remote displays such as display 22, thereby reducing communications bandwidth requirements and the time requirements of updating a remote display rapidly enough for highly interactive use.

Further, by varying the logic functions performed on address bits in logic elements 32 and 38, and the contents of look-up memory 36, mapping between address and region number can be be changed dynamically to efficiently adapt to different patterns of display access, such as those utilized for text and graphics applications. More complex region patterns can be created by varying the structure of logic sections 32 and 38, and the contents and size of memory 36.

Figure 3A:
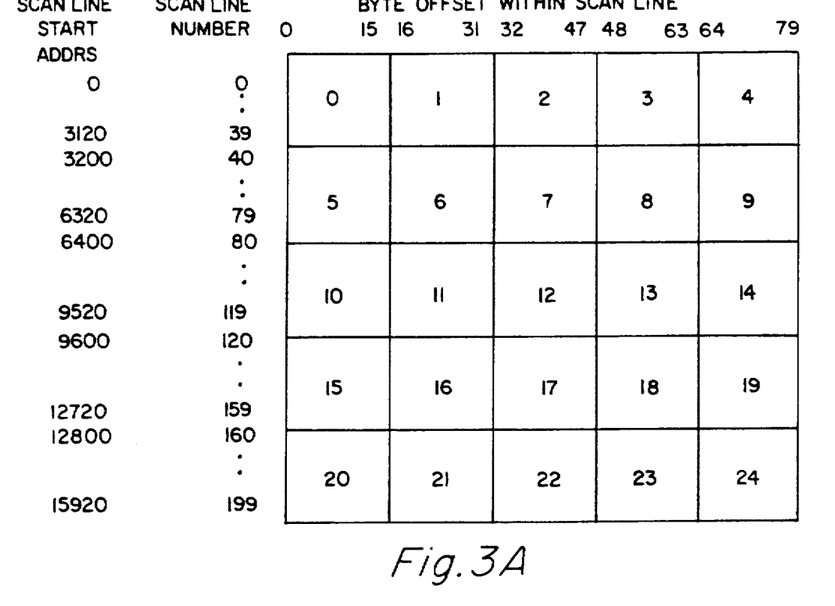
FIGS. 3a and 3b are a schematic diagram of region configuration according to the invention.

FIG. 3a illustrates a display memory divided into one possible set of memory regions. The horizontal axis represents byte offset from each scan line start address in memory, which is indicated in column (1). The scan lines in the illustrated region configuration, numbered 0 through 199 as indicated in column (2), are 80 bytes wide, and thus the illustrated scan-line starting points are separated by 80 address numbers. The display is thereby 200 scan lines deep and 80 bytes wide, while each of the 25 illustrated regions is 40 scan lines deep and 16 bytes wide. This configuration is typical of a high resolution graphics display, having 640 horizontal by 200 vertical pixels.

Figure 3B:
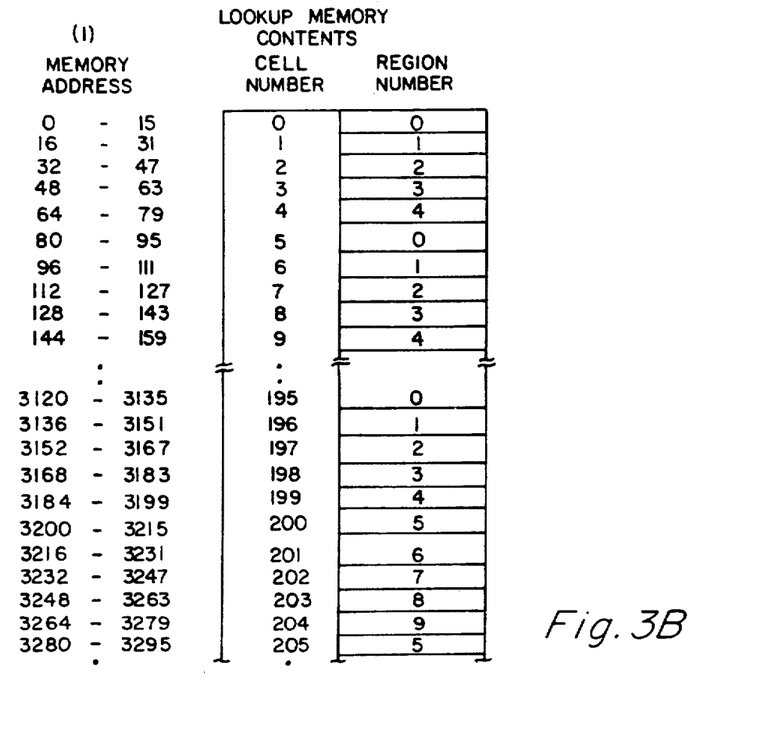

FIG. 3b illustrates the contents of look-up memory element 36 for the region configuration illustrated in FIG. 3a. Look-up memory element 36, as described above, contains a memory cell for each block in the display map illustrated in FIG. 3a. The display memory address covered by each cell are shown in column (1), and the corresponding cell is indicated in column (2). Column (3) indicates the region number section of look-up memory 36. It will thus be seen that each region illustrated in FIG. 3a contains 40 blocks each block corresponding to a sixteen byte portion of a scan line.

FIGS. 3a and 3b accordingly illustrate one possible region configuration. However, in accordance with the invention, the exact number of regions and their exact shape may be varied to suit a given application. The regions need not be rectangular, need not be aligned with each other, and need not be the same size. At the limit of region definition, each region could be defined by a single display element. However, this increases cost, by necessitating a large number of region-accessed indicators, and increases the communications load associated with sending a large number of region copies.

Accordingly, a balance among image quality, cost and speed must be maintained. A region configuration analogous to a 2-dimensional checkerboard, as illustrated in FIGS. 3a and 3b, provides acceptable image quality and fairly even bandwidth demand over a wide range of display memory accessing patterns. Those skilled in the art will understand that different region configurations, as enabled by this invention, will provide varying levels of performance for different display memory accessing patterns.

During execution of computer programs which are used to draw images on a display, successive display references tend to be visually local in two dimensions. That is, during a given memory access operation, most such programs more frequently modify display elements in the same two-dimensional region modified by preceding memory access operations, than they modify elements in other regions. This is the display analogue of the principle of "locality of reference " upon which the concept of on-demand virtual memory is based. Such two-dimensional visual locality of modification tends to hold true for applications such as alphabetic character painting, vector drawing and region filling known in the art.

This two-dimensional visual locality of modification is exploited in a preferred practice of the invention, in which a display memory is organized so that sequential groups of display elements, such as characters or pixels along a horizontal screen line, are represented by sequentially addressed bytes. In such a memory mapping configuration, the last display element of one screen line is followed immediately in memory by the first display element of another screen line, which is often the next line, as in the memory organization illustrated in FIGS. 3a and 3b.

Those skilled in the art will readily appreciate that the invention can also be practiced in connection with a multiple plane display memory system. In a multiple plane display memory system, the color, intensity and other attributes of each display element on the screen are determined by a multi-bit number. This multi-bit number is the intersection, or combination, of bits at corresponding addresses in various planes, as known in the art. In generating a region configuration for a multi-plane memory, mapping element 12 can define separate regions of different configurations and sizes for each memory plane. In order to define different regions in different planes, mapping element 12 utilizes combinations of plane address bits extracted from the memory address signal received from program 10.

The invention can also be practiced in an embodiment which dynamically allocates communications channel bandwidth among a plurality of terminals, based on display indicia for each terminal. Such an embodiment of the invention uses the activity indicated by changed display elements as a measure of activity at each terminal. This measure of activity level, i.e. the number, frequency or other measure of changed elements at each terminal during a predetermined time interval, serves as a basis for allocating CPU, memory and other system resources among various terminals in accordance with their respective activity levels. In this embodiment, update monitor element 18 scans update indicators in update indicator element 16 to determine the number, frequency or other measure of changed display elements at each display during a given time interval at each terminal. Communications subsystem 24 then allocates the communications channel in response to control signals received form update monitor element 18.

Those skilled in the art will also understand that the invention can further be practiced in an embodiment which dynamically allocates CPU, memory and other system resources among a plurality of terminals. In this embodiment of the invention, monitor element 18 scans update indicators in update indicator element 16 to determine the number, frequency or other measure of changed display elements at each display during a given time interval. System resource allocation element 28 can then allocate CPU and other resources among each terminal, in response to control signals received from monitor element 18.

The invention can also be practiced in connection with memory-access performance profiling systems, known in the art, not involved with graphic display.

Those skilled in the art will also understand that the invention can also be utilized for rapidly and efficiently updating a target memory copy of a given source memory, including a source memory not involved with graphics display. As long as the pattern of modification of a source memory exhibits some locality of modification, and even if such locality changes over time, the invention allows regions of arbitrary contiguity and size to be defined to match that locality. In this way, only modified regions of the source memory need be copied to a target memory to quickly render the target memory contents identical to the source memory contents.

It will thus be seen that the invention efficiently attains the objects set forth above. It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by letters patent is:

1. In digital processing apparatus having a source display buffer memory divided into a plurality of data-containing regions and a target display buffer memory interconnected to the source display buffer memory by at least one communications medium, a system for updating said target display buffer memory via said at least one communications medium, comprising:
   indicator means for generating and storing a digital update indicator corresponding to each of the plurality of data-containing regions of said source display buffer memory, said indicator means including (i) identification means for identifying which of said regions contain changed data values, and (ii) means, responsive to said identification means, for setting to a first value said update indicators whose corresponding identified regions have changed data values,
   monitor means responsive to said indicator means, for identifying said update indicators having said first value, transmitting means for transmitting data of each said identified region over said at least one communication medium to said target display buffer memory means for changing said update indicators from said first value to a second value in response to said monitor means identifying said updated indicators having said first value, and configuring means for dynamically defining the shape, size and configuration of the data-containing regions of said source display buffer memory to correspond to regions of arbitrary contiguity in said target display buffer memory.

2. In a digital processing apparatus as set forth in claim 1 wherein said means responsive to said monitor means does not terminate the updating of the second memory buffer.

3. In a digital processing apparatus as set forth in claim 1 wherein, upon operation of said means responsive to said monitor means, updating of said second memory buffer is maintained.

4. In a digital processing apparatus as set forth in claim wherein said means responsive to said monitor means sets to a second value only said update indicators.

5. The digital processing apparatus as set forth in claim 1 wherein said system has the text and graphic modes of operation, and wherein said configuring means is responsive to the operation mode of the system and defines the plurality of data-containing regions of the source display buffer memory in accordance with the operation mode of the system.

6. The data processing apparatus as defined in claim 1 wherein said target display buffer memory comprises a raster-scan display buffer memory and wherein the configuring means defines the plurality of regions of said source display buffer memory to correspond to one or more full scan lines of the raster-scan display buffer.

7. The data processing apparatus as defined in claim 1 wherein said target display buffer memory comprises a raster-scan display buffer memory and wherein the configuring means defines the plurality of regions of said source display buffer memory to correspond to contiguous portions of a plurality of contiguous scan lines of the raster-scan display buffer memory.

8. In digital processing apparatus having a source display buffer divided into a plurality of data-containing regions and a target display buffer interconnected by at least one communications medium to the source display buffer, a system for updating said target display buffer from said source display buffer via said at least one communication medium comprising:

indicator means for generating and storing a digital update indicator corresponding to each of the plurality of data-containing regions of said source display buffer, said indicator means including (i) identification means for identifying which of said regions contain changed data values, and (ii) means, responsive to said identification means, for setting to a first value said update indicators whose corresponding identified regions have changed data values, monitor means, responsive to said indicator means, for identifying said update indicators having said first value, transmitting means for transmitting data of each said identified region over said at least one communications medium to update said display, means for changing said update indicators from said first value to a second value in response to said monitor means identifying said updated indicators having said first value and, configuring means for dynamically defining the shape, size and configuration of the data-containing regions of said source display buffer to correspond to regions of arbitrary contiguity in said target display buffer.

9. In a digital processing apparatus having a plurality of source display buffers, each divided into a plurality of data-containing regions, and a plurality of target display buffers interconnected to said source display buffers by a plurality of communications media, a system for updating said target display buffers from said source display buffers via said communication media, comprising:

indicator means, for generating and storing a digital update indicator corresponding to each of the plurality of data-containing regions of each of said source display buffers, said indicator means including (i) identification means for identifying which of said regions contain changed data values and (ii) means, responsive to said identification means, for setting to a first value said update indicators whose corresponding identified regions have changed data values, monitor means, responsive to said indicator means, for identifying said update indicators having said first value, transmitting means for transmitting data of each said identified region over said communications media to update said display, means for changing said update indicators from said first value to a second value in response to said monitor means identifying said updated indicators having said first value and, configuring means for dynamically defining the shape, size and configuration of the data-containing regions of said source display buffers to correspond to regions of arbitrary contiguity in said target display buffers.

10. A system according to any of claims 1, 2 or 5 in which said reset means further comprises detecting means for detecting when said update indicators have said first value and for setting said update indicators to a second value, at least before the changed data values of said corresponding identified regions are transmitted.

11. In a digital processing apparatus having a plurality of source video display buffers, each divided into a plurality of data-containing regions, and a plurality of target video display buffers interconnected to said source video display buffers by a plurality of communications media, a system for updating said target video display buffers from said source video display buffers via said communication medium, comprising:

indicator means for generating and storing a plurality of update indicator bits, each update indicator bit corresponding to one of the plurality of data containing regions of one of said source video display buffers, said indicator means including (i) identification means for determining which of said regions contain changed data values and (ii) means, responsive to said identification means for setting to a first value, said update indicator bits whose corresponding identified regions have changed data values, monitor means, responsive to said indicator means, for identifying said update indicator bits having said first value, transmitting means for transmitting data of each of said identified region over said communications media to update said display, means for changing said update indicators from said first value to a second value in response to said monitor means identifying said updated indicators having said first value and, configuring means for dynamically defining the shape, size and configuration of the data-containing regions of said source video display buffers to correspond to regions of arbitrary contiguity in said target video display buffers.

* * * * *